US009071695B2

(12) United States Patent
Donaldson

(10) Patent No.: US 9,071,695 B2
(45) Date of Patent: Jun. 30, 2015

(54) ANTENNA OPTIMIZATION DEPENDENT ON USER CONTEXT

(75) Inventor: Thomas A. Donaldson, London (GB)

(73) Assignee: AliphCom, San Francisco, CA (US)

( * ) Notice: Subject to any disclaimer, the term of this patent is extended or adjusted under 35 U.S.C. 154(b) by 13 days.

(21) Appl. No.: 13/364,781

(22) Filed: Feb. 2, 2012

(65) Prior Publication Data

US 2012/0202560 A1     Aug. 9, 2012

Related U.S. Application Data

(60) Provisional application No. 61/439,742, filed on Feb. 4, 2011.

(51) Int. Cl.
| | |
|---|---|
| H04M 1/00 | (2006.01) |
| H04M 1/60 | (2006.01) |
| H01Q 3/24 | (2006.01) |
| H01Q 25/00 | (2006.01) |
| H04B 7/02 | (2006.01) |

(52) U.S. Cl.
CPC ............. *H04M 1/6066* (2013.01); *H01Q 3/24* (2013.01); *H01Q 25/005* (2013.01); *H04B 7/02* (2013.01)

(58) Field of Classification Search
USPC ............ 455/550.1, 575.7; 343/777, 778, 782
See application file for complete search history.

(56) References Cited

U.S. PATENT DOCUMENTS

| | | | |
|---|---|---|---|
| 5,410,324 A | 4/1995 | Bolomey et al. | |
| 6,549,788 B1 * | 4/2003 | Karabinis et al. | 455/575.7 |
| 6,600,901 B1 | 7/2003 | Koehne et al. | |
| 8,018,390 B2 * | 9/2011 | Davidson et al. | 343/754 |
| 8,217,843 B2 * | 7/2012 | Shtrom et al. | 343/702 |
| 2004/0214621 A1 | 10/2004 | Ponce De Leon et al. | |
| 2008/0112468 A1 * | 5/2008 | Sheynblat et al. | 375/148 |
| 2009/0295648 A1 | 12/2009 | Dorsey et al. | |
| 2010/0279751 A1 * | 11/2010 | Pourseyed et al. | 455/575.7 |
| 2013/0237272 A1 * | 9/2013 | Prasad | 455/517 |

OTHER PUBLICATIONS

International Search Report and Written Opinion mailed Apr. 3, 2012 in Application No. PCT/US2012/023680 filed Feb. 2, 2012.

* cited by examiner

*Primary Examiner* — Magdi Elhag
(74) *Attorney, Agent, or Firm* — Kokka & Backus, PC

(57) ABSTRACT

Systems, apparatuses, devices, and methods for wireless communications are disclosed. A detection system is used to detect a usage mode or orientation of a wireless communication device. The usage mode or orientation is used to vary the radiation pattern of the antenna of the wireless communication device. By varying the radiation pattern based on the usage mode or orientation, battery life and the quality of transmission and reception can be increased, while the size and cost of the device can be reduced. Embodiments of the invention may be used in numerous applications, such as mobile phones, PDA's, and laptops.

19 Claims, 15 Drawing Sheets

ANTENNA OPTIMIZATION DEPENDENT ON USER CONTEXT

CROSS-REFERENCES TO RELATED APPLICATIONS

This is a non-provisional application that claims the benefit of commonly assigned U.S. Provisional Application No. 61/439,742, filed Feb. 4, 2011, entitled "Antenna Optimization Dependent on User Context," the entirety of which is herein incorporated by reference for all purposes.

BACKGROUND

Embodiments of the invention are directed to wireless communication devices, and more specifically, to improving the efficiency of portable wireless communication devices used in a variety of situations, such as mobile telephones paired with mono or stereo Bluetooth headsets, or portable computers paired with mono or stereo Bluetooth headsets.

For many such devices, the power required for transmitting and receiving data over the transceiver (or radio) is a substantial and significant proportion of the overall system power consumption. Inefficiency in the transceiver performance can lead to overall system inefficiency, resulting in user dissatisfaction, poor battery life, poor quality reception or transmission, or larger and more costly devices due to larger and more expensive batteries.

There are many existing systems used to optimize transceiver communications, including Yagi antennas, directional antennas, diversity systems, monopole and dipole antennas, planar patch antennas, and so forth. Some of these have radiation patterns that are broadly omni-directional (that is, the intensity of radiation produced by or detected by the antenna at a given distance from the antenna is approximately the same in all directions), whereas some are strongly directional (that is, the intensity of radiation at a given distance is much higher in some directions relative to the antenna than in others).

Designers of systems in which antennas are utilized are often careful to ensure that the radiation pattern for their antenna is appropriate for the typical usage or use cases of a device. For example, in a mobile phone, the antenna and associated components are designed so that the radiation pattern is typically such that little radiation is directed towards the user's head when they are holding the phone in a manner typical of making a phone call, as radiation directed to the head is absorbed by the head; therefore, this represents an inefficient direction to orient radiation and hence transmit voice communications or data. This arrangement may also be used in order to reduce the amount of energy absorbed by the head for health reasons. As another example, the manufacturer of a Bluetooth headset might choose to design an antenna with a radiation pattern that is optimal for communicating with a mobile phone in a user's pocket or purse.

A disadvantage of such a design methodology is that such designs can be highly non-optimal in other common situations of use. For example, consider a mobile phone with a radiation pattern optimized as above for use when the user is holding the mobile phone to his or her ear. For such a mobile phone, consider the case where the user has the mobile phone in a pocket, with the outward face when held to the ear now inward-facing in the pocket. In this configuration, the radiation direction with the strongest intensity is oriented towards the user's body and will be absorbed, while the direction away from the body is the direction with the weakest intensity. Such a mobile phone position or orientation is very inefficient with regard to voice or data transmission and may consume substantially more power than would otherwise be needed.

Another design strategy that may be employed is to utilize an omni-directional radiation pattern, as such a pattern will typically not have such a disadvantage. However, such a design tradeoff means that the transceiver is less efficient in the "normal" or typical use case, and will in general be of non-optimal efficiency in other usage cases.

As recognized by the inventor, it is desirable that the radiation pattern of an antenna that is part of a headset, handset, or other device be variable based on the different usage scenarios or device configurations in which the device may be used, for purposes such as voice communication and/or data transmission. Such a variable pattern would have multiple benefits, including, but not limited to, improving battery life, reducing size and cost, and improving the quality of voice or data transmission and reception. Embodiments of the invention address these problems and other problems individually and collectively.

SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Embodiments of the invention are directed to systems, apparatuses, devices, and methods for wireless communications. In some embodiments, a detection system can be used to detect a usage mode or orientation of a wireless communication device, such as a wireless headset or mobile phone. The detected usage mode or orientation information can be used to vary the radiation pattern of the antenna of the wireless communication device, where the antenna is used as part of the transmission and/or reception of signals representing voice and/or data communications. By varying the radiation pattern based on the usage mode or orientation, battery life and the quality of transmission and reception can be increased, while the size and cost of the device can be reduced. Embodiments of the invention may be used in numerous applications including, but not limited to, headsets, mobile phones, PDA's, and laptops.

A wireless communication device is disclosed according to an embodiment of the invention. A wireless communication device can include a usage context detection system, an antenna system and an antenna optimization system. The usage context detection system can operate to detect a usage mode of the wireless communication device. The antenna system can have a variable radiation pattern. The antenna optimization system can operate to vary the radiation pattern of the antenna system based on the detected usage mode of the wireless communication device.

A method for modifying an antenna configuration is also disclosed according to an embodiment of the invention. The method can include a number of steps such as determining a usage mode of the wireless communication device. A suitable antenna configuration can be determined that is based at least in part on the usage mode of the wireless communication device. The antenna configuration can then be modified according to the suitable antenna configuration. The method can operate on various components of a wireless device.

Another wireless communication device is disclosed according to yet another embodiment of the invention. The wireless communication device can include first and second antennas, a detector and circuitry. The first antenna can have a first radiation pattern. The second antenna can have a second radiation pattern. The detector can be configured to detect an orientation of the wireless communication device. The circuitry can be configured to switch between the first antenna and the second antenna based on the orientation of the wireless communication device.

Other objects and advantages of the invention will be apparent to one of ordinary skill in the art upon review of the detailed description of the invention and the included figures.

DETAILED DESCRIPTION

Figure 1A:
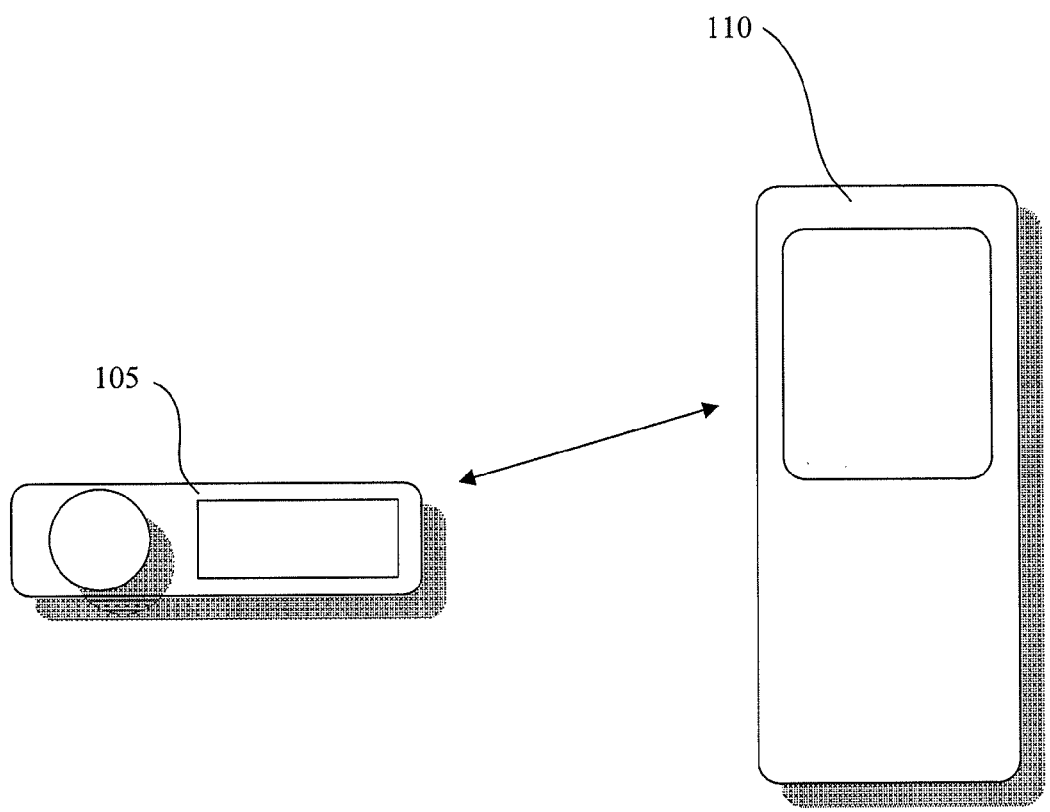
FIG. 1A illustrates a wireless communication system according to some embodiments of the invention.

The subject matter of embodiments of the invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention are directed to systems, apparatuses, devices, and methods for optimizing radiation patterns produced by antenna systems in wireless devices. As will be described, this can be done in a number of ways, using a number of different processes and various components and/or devices. Implementation of embodiments of the invention can be used to improve communication between wireless devices and/or to improve the power efficiency of such devices, thereby increasing battery life and potentially reducing the size and weight of the devices.

According to one aspect, embodiments of the invention may include a wireless device that includes an antenna system with a radiation pattern that can be varied. The wireless device may also include a sensor that can detect a usage mode or a user interface that can receive from a user an indication of the usage mode (or orientation) of the wireless device. Based on the usage mode, the invention may be used to change the radiation pattern of the antenna to optimize the radiation pattern for the usage mode.

According to another aspect, embodiments of the invention may also vary the radiation pattern of a wireless device's antenna in response to a detected usage, a change in usage, a change in orientation, or a detected orientation so as to optimize the radiation pattern of the antenna for that usage.

According to yet another aspect, embodiments of the invention may include an antenna system that includes a plurality of antennas, with at least some of the antennas having a different radiation pattern from each other. The wireless device is able to switch between one or more antennas to implement a different radiation pattern. The wireless device can also include an accelerometer configured to determine the orientation of the device. The wireless device can then use one or more of the antennas based on the orientation to provide an optimized radiation pattern for that orientation or position. Moreover, a wireless device can modify the output of an antenna array (e.g., by beam forming methods) based on the orientation to achieve a more optimal use of the device's transmitter and receiver.

As used herein the term "wireless device" can include any device that communicates using an antenna(s). The descriptions of some embodiments of the invention describe communication between peer devices and wireless accessories. While both are wireless devices, a peer device generally includes some command and/or control over a wireless accessory through a wireless communication channel. This distinction is helpful in understanding some embodiments of the invention. However, both are wireless devices and any embodiment of the invention that describes one extends to the other.

FIG. 1A illustrates a wireless communication system according to one embodiment of the present invention. The wireless communication system comprises a wireless accessory 105 communicating wirelessly with a peer device 110. For example, the wireless accessory 105 can include head phones, speakers, Bluetooth headset, keyboards, mouse, controller, remote control, game controller, mobile phone or mobile data modem, etc. Moreover, the wireless accessory 105 can communicate with the peer device using any suitable wireless communication scheme known in the art, including for example, Bluetooth, Zigbee, WiFi, GSM, CDMA, etc. Peer device 110 can include a mobile phone, laptop computer, automobile, desk phone, PDA, citizen's band radio, desktop computer, tablet, television, server, central computer, tuner, entertainment device, access points, gaming system, smart home computer, cellular network base station, etc.

Figure 1B:
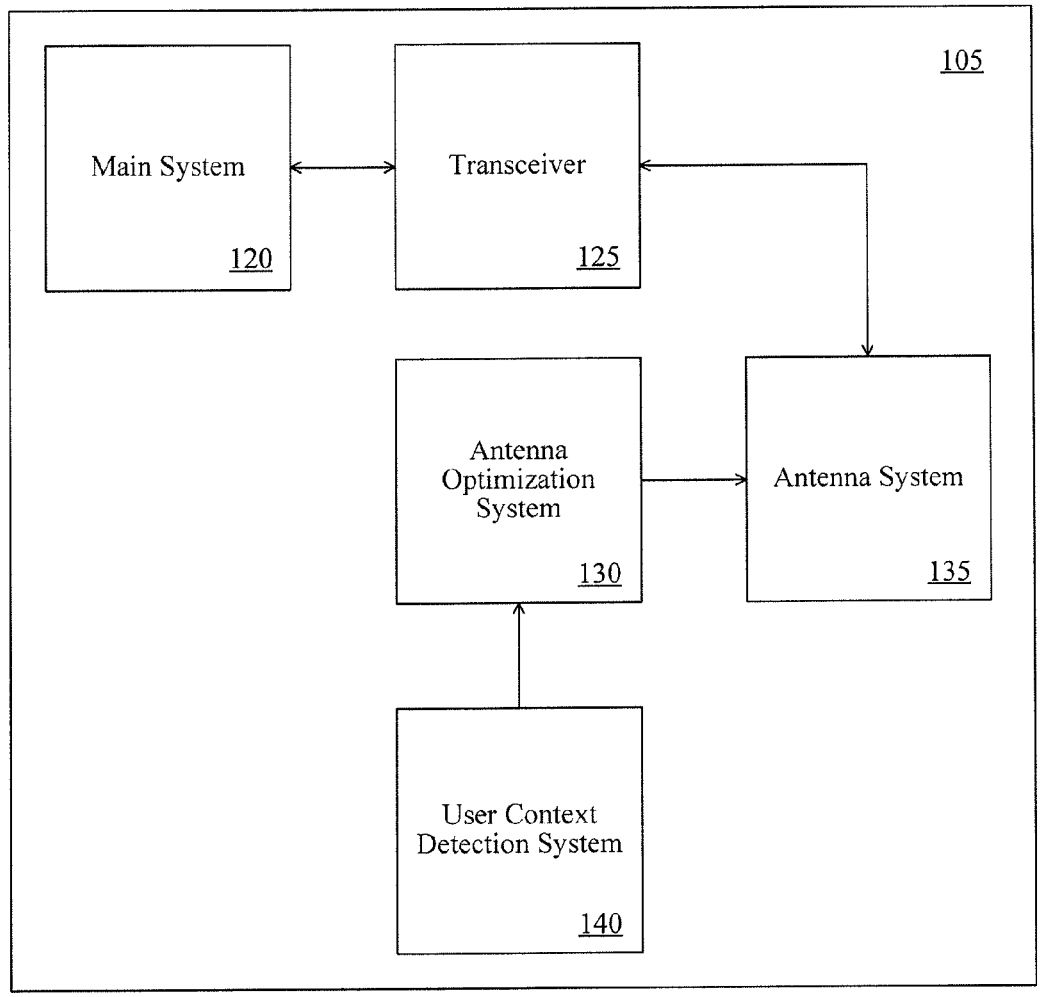
FIG. 1B is a block diagram of a peer device according to some embodiments of the invention.

FIG. 1B is a block diagram of peer device 105 according to one embodiment of the present invention. The peer device 105 can include, in addition to other systems used to perform traditional functions, an antenna system 135 whose radiation pattern can be varied. The antenna system 135 is coupled to the transceiver 125, which can be coupled with the main system 120. A user context detection mechanism 140 that detects the orientation or configuration of the peer device 105 is also included. An antenna optimization system 130 is also included that can vary the antenna radiation pattern based on detected orientation or configuration data from the context detection mechanism 140. Each of these components can be implemented in hardware and/or software, including for example, an electronic processor or central processing unit (CPU) that is programmed to execute a set of instructions or commands, firmware, a programmed gate array, etc.

The antenna system 135 can receive signals (i.e., electromagnetic radiation in a specific band or frequency range) from the transceiver 125 and transmit them over the air to another device. The antenna system 135 can also receive wireless signals over the air from another device and transmit them to the transceiver 125 for processing. In addition, the antenna system 125 can receive an input signal from the antenna optimization system 130 to define a parameter or variable (for example, an antenna configuration mode) that can be used to alter the antenna system in order to optimize the radiation pattern for a particular purpose, use case, configuration, position, etc., as will be discussed in greater detail below. Note that a variety of antenna systems (or types) are possible and may be used in embodiments of the present invention, and for each, one or more antenna optimization systems may be possible.

The user context detection mechanism 140 operates to determine one or more features of the current usage mode, orientation, position, or configuration of the wireless device, as part of optimizing the radiation pattern. A wide range of usage modes, orientations, positions, or configurations are possible to determine; for example, the orientation of the device, whether or not the device is being held, whether or not the device is currently on a call, the location of the device, the proximity of the device to a user, what operating mode is in use (for example, whether a mobile phone is in use with a Bluetooth headset or without one), what type of information is being communicated, whether the device is currently being worn, etc. Moreover, the user context detection mechanism can instead (or in addition) receive input from a user interface that indicates a user-specified usage mode (which may then be used to set one or more parameters or operational features of the antenna system). The user context detection mechanism 140 can receive as an input information correlated with a usage context, where such information may be a physical signal (such as the direction and strength of an acceleration or the pressure on a touch surface), or an electrical or software-generated signal (such as a software message from a software system in the peer device that changes according to usage, or a communicated message from a software system in the peer device that changes according to usage), or another suitable form of data. It can provide as an output a signal correlated with a user context and/or usage mode. Some examples of a user context detection system 140 are discussed below.

The antenna optimization system 130 can operate to determine a suitable antenna configuration based on information from the user context detection mechanism 140, and can provide an output signal to the antenna system 135. The antenna optimization system 130 may be used to set one or more parameters or operational features of the antenna system 135 (e.g., selecting which elements of the system will be used for transmission or reception of signals, the power applied to the elements of the system, the order in which power is applied to the elements of the system, whether a phase shift is introduced between the signals applied to different elements of the antenna system, etc.).

Antenna system 135 can include any number of antennas in various configurations. For example, the elements of antenna system 135 can include, but are not limited to, monopole antennas, dipole antennas, Yagi antennas, PCB meander-line antennas, patch antennas, antenna arrays, and the like. Various means of varying the antenna radiation pattern are also possible and are considered to be within the underlying concept of the invention. These include, but are not limited to, switching between a plurality of antennas, switching antenna components on or off, changing the phase relationship between different antennas in a multiple-antenna system (or between elements of a single antenna) as in a phased array design, physically rotating or otherwise moving an antenna, physically rotating or moving elements of an antenna (such as a reflector or ground plane), and so forth.

Figure 2A:
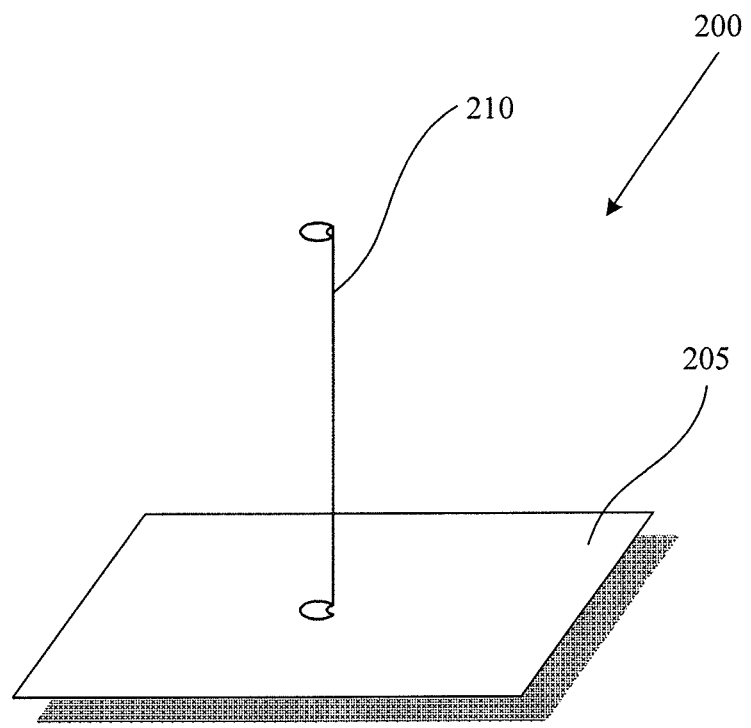
FIG. 2A illustrates a three-dimensional view of a monopole antenna according to some embodiments of the invention.

FIG. 2A illustrates an example of an antenna system with a variable radiation pattern. The figure shows a three-dimensional view of a monopole antenna 200. The monopole antenna comprises a ground plane 205 and a straight wire 210 or other conductor. In some configurations, the straight wire (or whip) 210 can have a length equal to a quarter wavelength of the wireless signal being transmitted. Various other lengths can be used. The straight wire 210 can be arranged perpendicular to the ground plane 205.

Figure 2B:
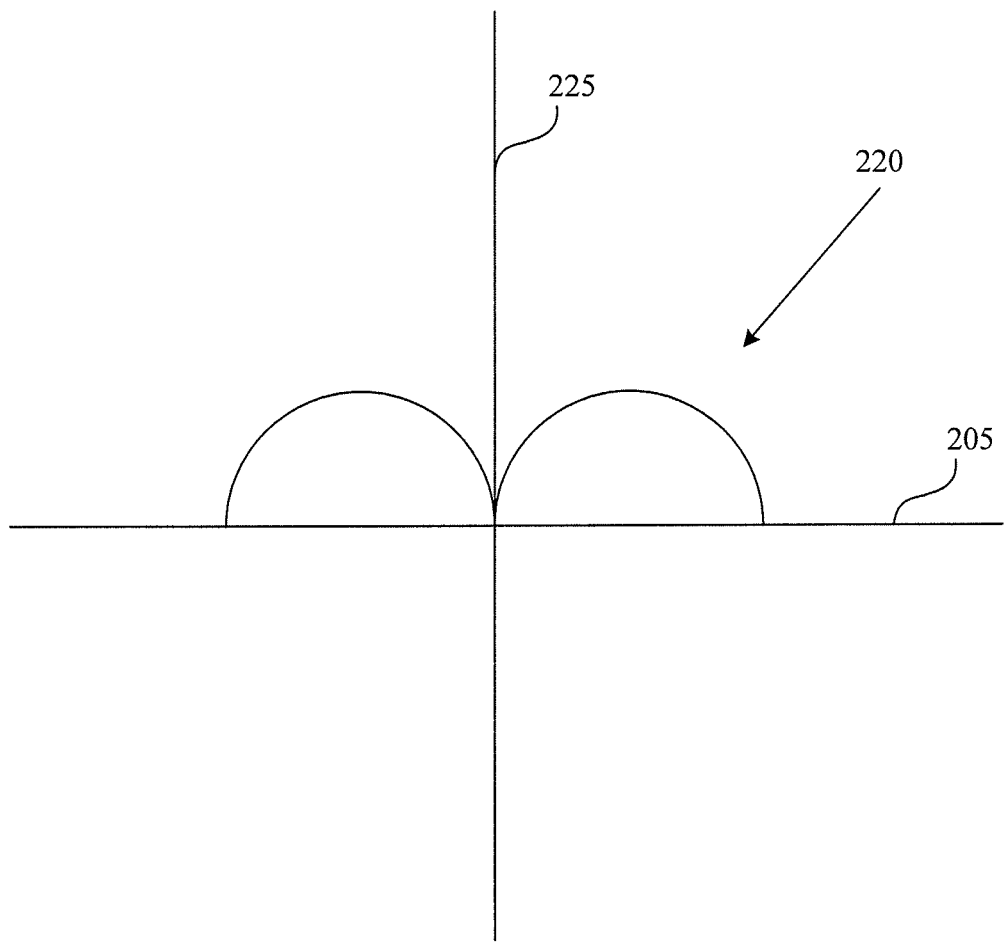
FIG. 2B illustrates a side view of a radiation pattern of a monopole antenna according to some embodiments of the invention.
Figure 2C:
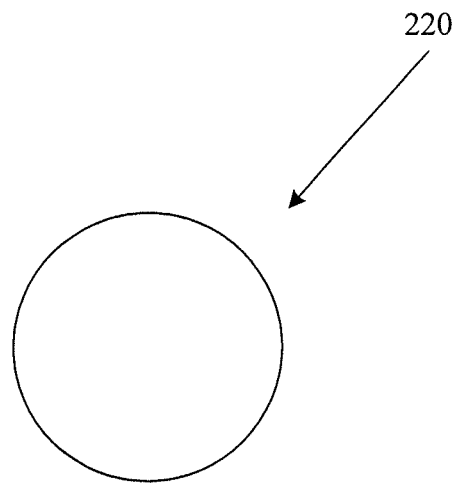
FIG. 2C illustrates a top view of a radiation pattern of a monopole antenna according to some embodiments of the invention.

FIG. 2B illustrates the side view of a radiation pattern 220 produced from a monopole antenna. FIG. 2C illustrates the top view of the radiation pattern 220. The radiation pattern from a monopole antenna is typically considered to be semi-toroidal; that is, it does not extend significantly below the ground plane 205, it extends equally in directions perpendicular to the antenna axis 225 above the ground plane 205, and it has limited strength in the direction of the antenna axis away from the ground plane 205. The size, orientation, and/or properties of the ground plane can skew the shape of the radiation pattern 220.

For such an antenna, peer devices that are behind the ground plane 205 will generally have lower reception, and peer devices in the direction of the antenna axis in front of the ground plane will also have lower reception. Peer devices situated axially to the antenna axis will typically have better reception, as a result of the radiation pattern of the antenna.

Figure 3:
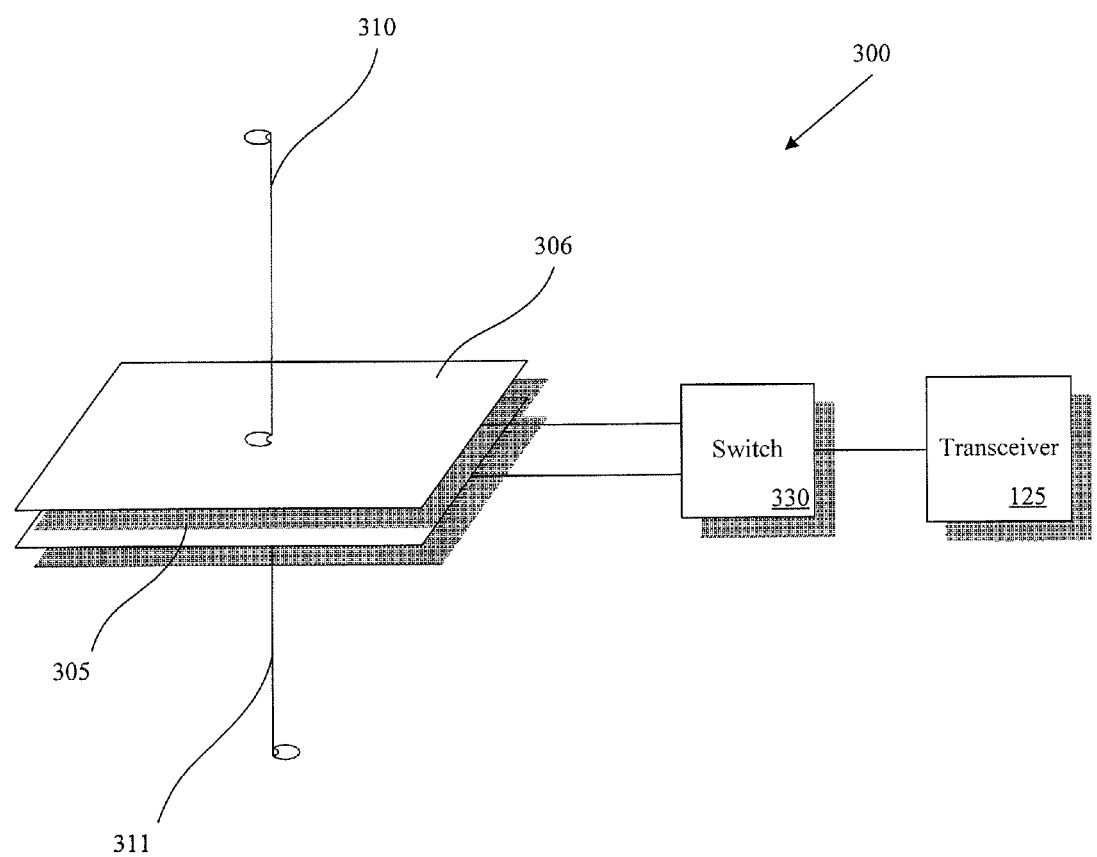
FIG. 3 illustrates an antenna system with a variable radiation pattern according to some embodiments of the invention.

FIG. 3 illustrates an antenna system 300 with a variable radiation pattern that may be used in an embodiment of the present invention. In this example, the system comprises two coaxial monopole antennas 310 and 311 pointing in opposite directions. Each monopole antenna 310 and 311 includes a separate ground plane 305 and 306. In other embodiments a single ground plan can be used. The monopole antennas 310 and 311 are connected to the transceiver 125 via a switch 330. The switch 330 can selectively connect at least one of the monopole antennas 310 and 311 at a time to the transceiver. In some embodiments, the switch 330 can connect either one or the other of the two monopole antennas 310 and 311.

Note that antenna system 300 has a variable radiation pattern depending on the position of the switch. If the switch is in such a position as to connect the upper antenna 310, the radiation pattern is a semi-toroid oriented upwards, with little radiation in the downward direction (as seen in FIG. 2B). However, if the switch is in such a position as to connect the lower antenna 311, the radiation pattern is a semi-toroid oriented downwards, with little radiation in the upward direction. It will be seen, therefore, that by changing the position of the switch, the radiation pattern may be changed from downward-facing to upward-facing.

Figure 4A:
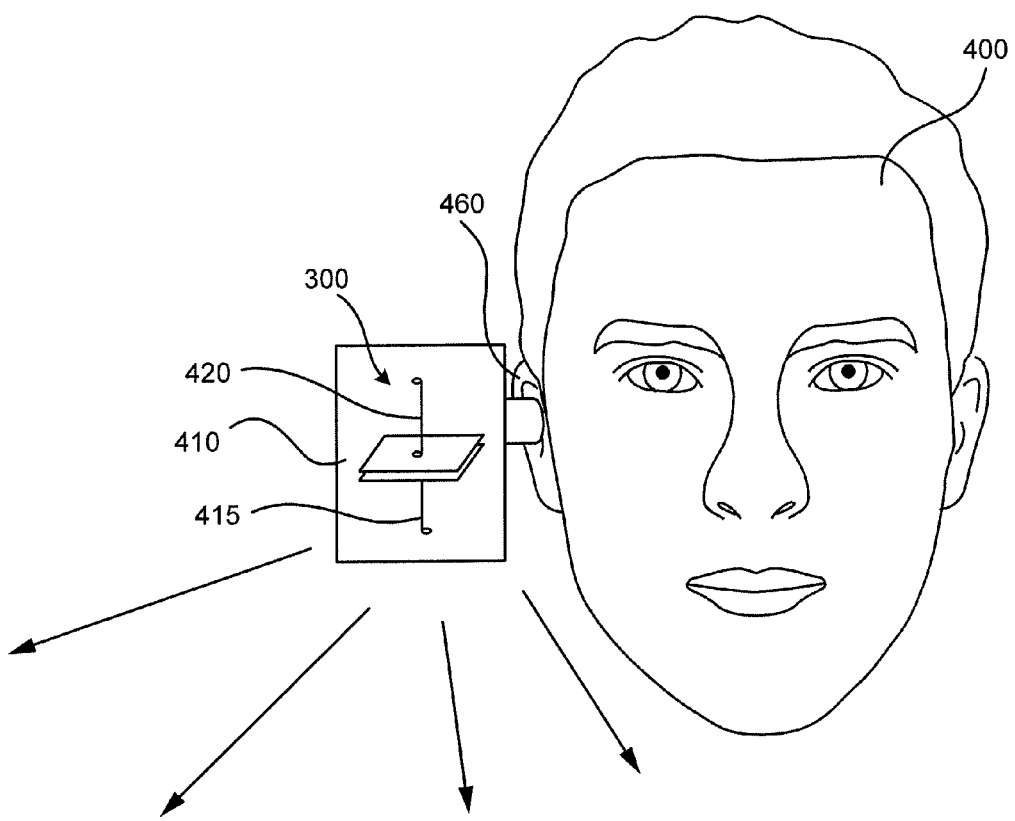
FIG. 4A illustrates an antenna system in a Bluetooth headset worn on the right ear of a user according to some embodiments of the invention.

FIG. 4A illustrates the antenna system 300 in FIG. 3 used in a Bluetooth headset 410 worn on the right ear 460 of a user 400 that may be used in an embodiment of the present invention. Bluetooth headsets are typically used with a peer device such as a phone that is typically nearby in a pocket, in a user's hand, on a table, on a desk, or in a handbag. In such common usage positions, the peer device is commonly below the head of the user. In such situations it may be advantageous to use an antenna with a radiation pattern that is optimized in the downward direction from the user's headset. Doing so can reduce the power consumption of the antenna and/or improve the reception. In such a situation, it may be advantageous to connect monopole antenna 415 to the transceiver using a switch (e.g., transceiver 125 with switch 330).

Figure 4B:
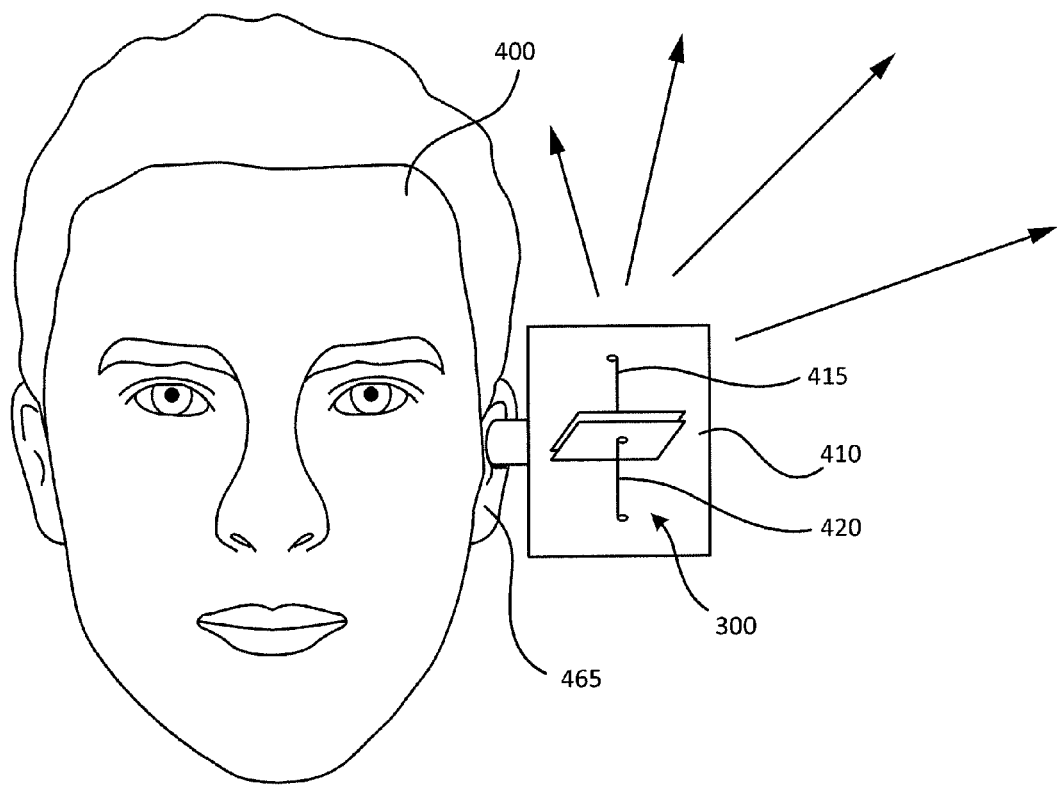
FIG. 4B illustrates an antenna system in a Bluetooth headset worn on the left ear of a user according to some embodiments of the invention.

FIG. 4B illustrates the antenna system 300 in FIG. 3 used in a Bluetooth headset 410 worn on the left ear 465 of a user 400 that may be used in an embodiment of the present invention. The antenna orientations have changed as a result of the headset 410 being rotated so as to fit the left ear of the user 400. Antenna 415 is oriented upwards and antenna 410 is oriented downward. Use of antenna 415 would lead to poor reception and/or require high power when used with a phone in the common positions described above. Setting the switch (e.g., switch 330) to connect antenna 420 will typically provide a more optimal radiation pattern that may result in lower power consumption and better reception.

Figure 5A:
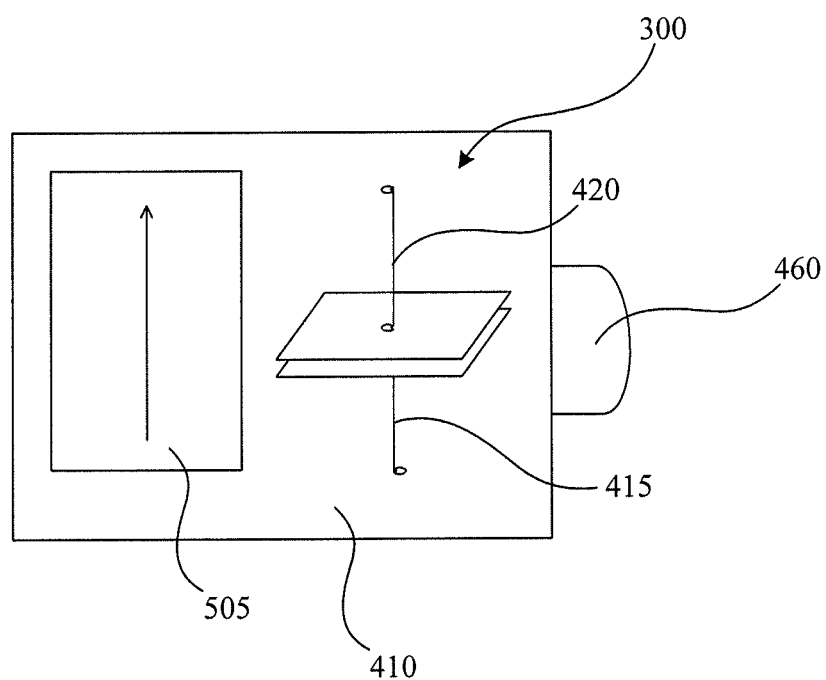
FIG. 5A illustrates a user context detection system in use in a Bluetooth headset worn on the right ear of a user according to some embodiments of the invention.

FIG. 5A illustrates an example of a user context detection system in a Bluetooth headset 410 worn on the right ear 460 according to some embodiments of the invention. The antenna system 300 of FIG. 3 is included along with the context detection system. In this example, the user context detection system includes an accelerometer 505. Accelerometer 505 may be used to indicate the orientation of the Bluetooth headset 410 relative to the Earth's gravitational field. When the headset 410 is in use in the right ear, the accelerometer can be oriented in one direction (e.g., up as shown in the figure). This can be considered to be the positive direction, and one may consider the signal from the accelerometer to be a positive signal.

Figure 5B:
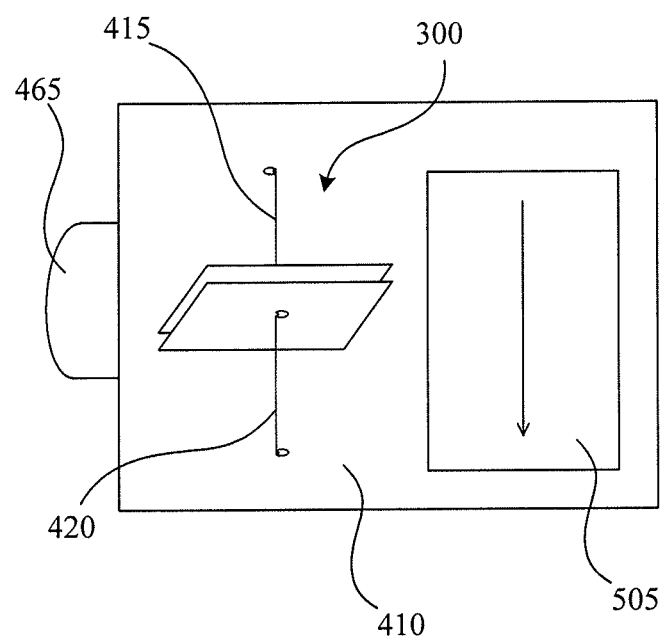
FIG. 5B illustrates a user context detection system in use in a Bluetooth headset worn on the left ear of a user according to some embodiments of the invention.

FIG. 5B illustrates an example of a user context detection system in a Bluetooth headset 410 worn on the left ear 465 according to some embodiments of the invention. When the headset is in use in the left ear 465, the accelerometer 505 is oriented in the opposite direction as shown in FIG. 5A. The force of gravity acts in the negative direction and the signal from the accelerometer signal may be considered to be a negative signal.

For the system illustrated in FIGS. 5A and 5B, the action of the antenna optimization may be described in accordance with the following table:

| Accelerometer Signal | Antenna Switch Position |
| --- | --- |
| Positive | Antenna 415 |
| Negative | Antenna 420 |

Such a system may be generalized to a system with multiple monopole antennas oriented in different directions, or to a system with multiple antennas with different radiation patterns, where the accelerometer direction is used to select an antenna element (or elements) based on the orientation as determined using the accelerometer.

Where two monopole antennas have been described, it is noted that a wide variety of antenna systems with various patterns may be used in embodiments of the present invention. In some embodiments, a system with a larger number of monopole antennas may be used. For example, 2 or 3 sets of monopole antennas like those shown in FIG. 3 can be oriented orthogonally to one another. In such embodiments, the orientation system may determine which antenna is oriented most closely to a given direction.

In another embodiment of the invention, a system of dipole antennas may be used, for example two or three dipole antennas situated orthogonally to each other. In such embodiments, the radiation pattern is toroidal and the antenna may be chosen based on the orientation so as to ensure the peer device is within the toroid of the in-use dipole. In embodiments of the invention with more than one antenna, multiple antennas may be switched on as desired to obtain more efficient use of transmission power.

A wireless device can also employ an antenna system that includes an antenna array. An antenna array can produce a relatively complex radiation pattern that has multiple lobes and nulls. The number, size, and spacing of the lobes can be a function of the separation of the antenna elements and/or the phase shift between the signals fed to each antenna or antenna element. In such an instance, the antenna radiation pattern may be varied dynamically by changing the phase shift between antennas (or antenna elements) or by selecting different antennas with different spacing(s) so as to select a lobe/null pattern that best fits a particular application, use case, orientation, position, physical location, configuration, etc.

In embodiments with multiple antennas, rather than using a switch, a transceiver can be separately coupled to each antenna. The transceiver can send data independently to the individual antennas. In this way, the transceiver can switch between which antenna or antenna element is being used.

A variety of usage context detection mechanisms may be used in embodiments of the present invention, including alternative orientation detection mechanisms (for example, mercury switches), proximity detectors (for example, infra-red proximity detectors), detectors that determine the place of use (for example, accelerometers and/or global positioning system sensors used to determine whether the user is driving in a car, walking or sitting down) and signals from the main system (for example, in a mobile phone, a signal indicating whether a Bluetooth headset is in use or not).

Figure 6:
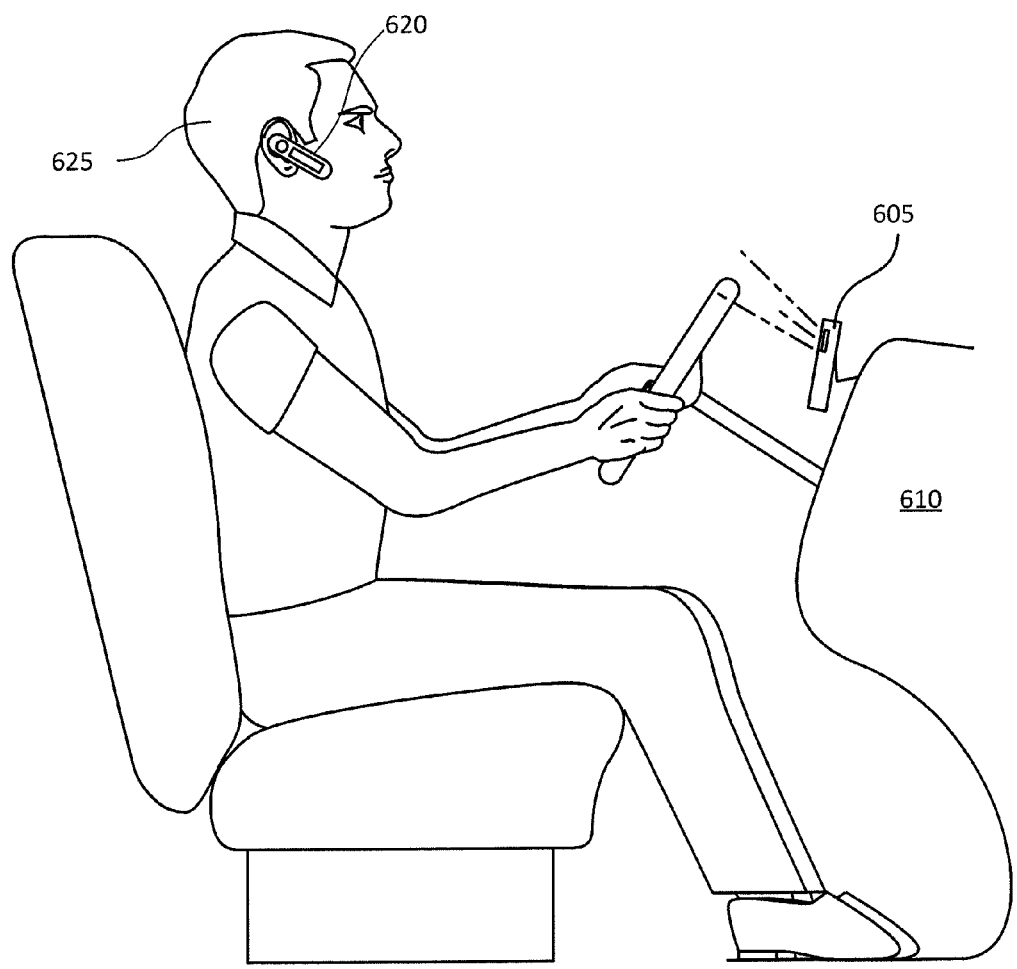
FIG. 6 illustrates a user in a car using a Bluetooth headset with a mobile phone according to some embodiments of the invention.

FIG. 6 illustrates an antenna system in use in a peer device 605 within a motor vehicle according to some embodiments of the invention. Peer device 605 can be mounted on the dash of a motor vehicle 610. A user 625 can operate the vehicle 610 and use a peer device 620 to communicate with the peer device 605.

According to this embodiment, the user may input a usage mode into the peer device 605 through a user interface indicating that the peer device 605 is to be used with a Bluetooth headset with the peer device 605 being mounted on the dash of a vehicle. Based on this information, the peer device 605 may determine that a suitable (i.e., more optimal or otherwise desirable) antenna configuration is one in which the maximum antenna gain of the peer device 605 is in a direction out of the front face of the peer device 605 (i.e., toward the user's head). The peer device 605 may also receive information (e.g., from an accelerometer) indicating that the orientation of the peer device 605 is mounted as expected. Once the desired antenna configuration is determined, the multi-directional antenna may be controlled to operate in the determined configuration.

Figure 7:
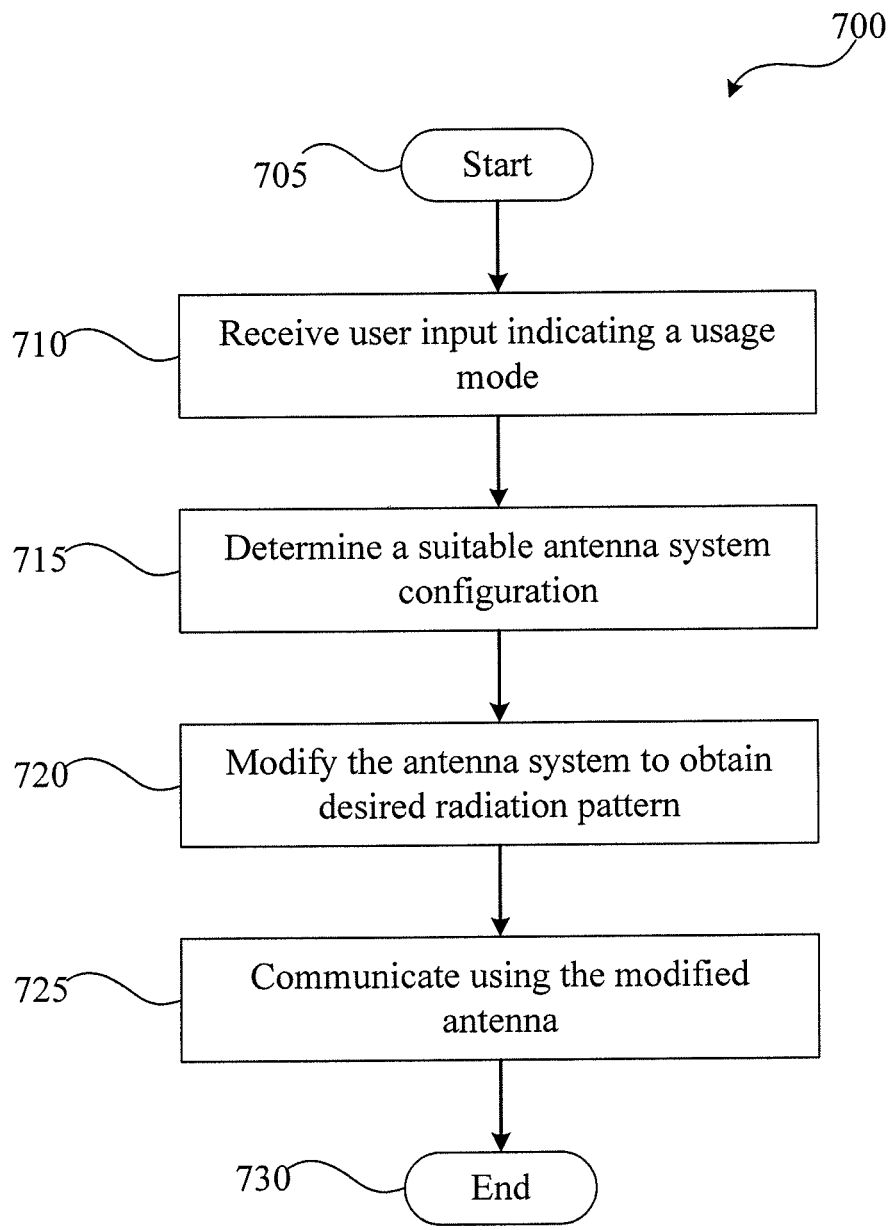
FIG. 7 is flowchart of a method for detecting and utilizing a usage mode in a peer device that can alter an antenna configuration according to some embodiments of the invention.

FIG. 7 is a flow chart of process 700 that can be used to optimize antenna usage in a peer device according to some embodiments of the invention. While process 700 is described in regard to a peer device, this process may also be used with another device (such as a wireless accessory or other type of control or master device). Process 700 can be used, for example, in execution of computer-implemented software instructions for detecting a usage mode and using that information to alter an antenna configuration. In some embodiments, software instructions can be implemented on a peer device although they can similarly be implemented on another device. The computer-implemented instructions may be executed by a suitably programmed computer, processor, or central processing unit (CPU).

Process 700 can start at block 705. At block 710, the peer device can detect a user context by receiving a user input indicating a usage mode. For example, the user may input information into the peer device indicating a general usage mode such as "Bluetooth headset" mode, as well as information indicating a specific usage mode such as "peer device in pocket," "peer device in hand," "peer device on desk," "peer device mounted on vehicle dash," "peer device in motion," etc. Various other user context data may also be used, including other possible usage modes.

At block 715, based in whole or in part on the user context, the peer device determines a suitable configuration for an antenna system. In some situations, the peer device determines an antenna pattern from a set of predetermined antenna patterns that provide the highest expected gain in the direction of the peer device. A predetermined set of antenna patterns can correspond with predetermined antenna configurations that can be implemented. A table can be stored in a suitable data storage or memory that relates various antenna patterns with various user contexts. The peer device may determine a suitable configuration for the antenna system by, for example, associating each usage mode with a particular antenna configuration and selecting the antenna configuration based on the user-input usage mode. For example, for a usage mode where the use of a Bluetooth headset is indicated and the peer device is located in the user's pocket, the peer device may select an antenna configuration that provides the maximum gain in an upward direction (i.e., toward the user's head).

Once a suitable antenna configuration is determined, the antenna system of the peer device is modified to operate in that configuration at block 720. As illustrated in FIG. 3, this may consist of enabling, selecting or switching one or more monopole antennas arranged in different directions. This may also consist of operating other types of antennas in a variety of different configurations to optimize the radiation pattern for the indicated use mode, etc. After the antenna system of the peer device is modified to operate in the determined configuration, the peer device may communicate to the peer device using the antenna system at block 725. At block 730 process 700 may end.

In determining a suitable configuration for an antenna system provided in the peer device, the peer device may also (or instead) receive information indicating the orientation (or other information such as location, position, or relative position) of the peer device and use such information in its determination. For example, the peer device may include an accelerometer similar to that illustrated in FIGS. 5A and 5B. If the accelerometer indicates that the peer device is arranged in a non-standard orientation (e.g., the peer device is upside down), the peer device may determine that the suitable configuration for the antenna system is that having a maximum gain in a downward direction (i.e., toward the user's head).

Figure 8:
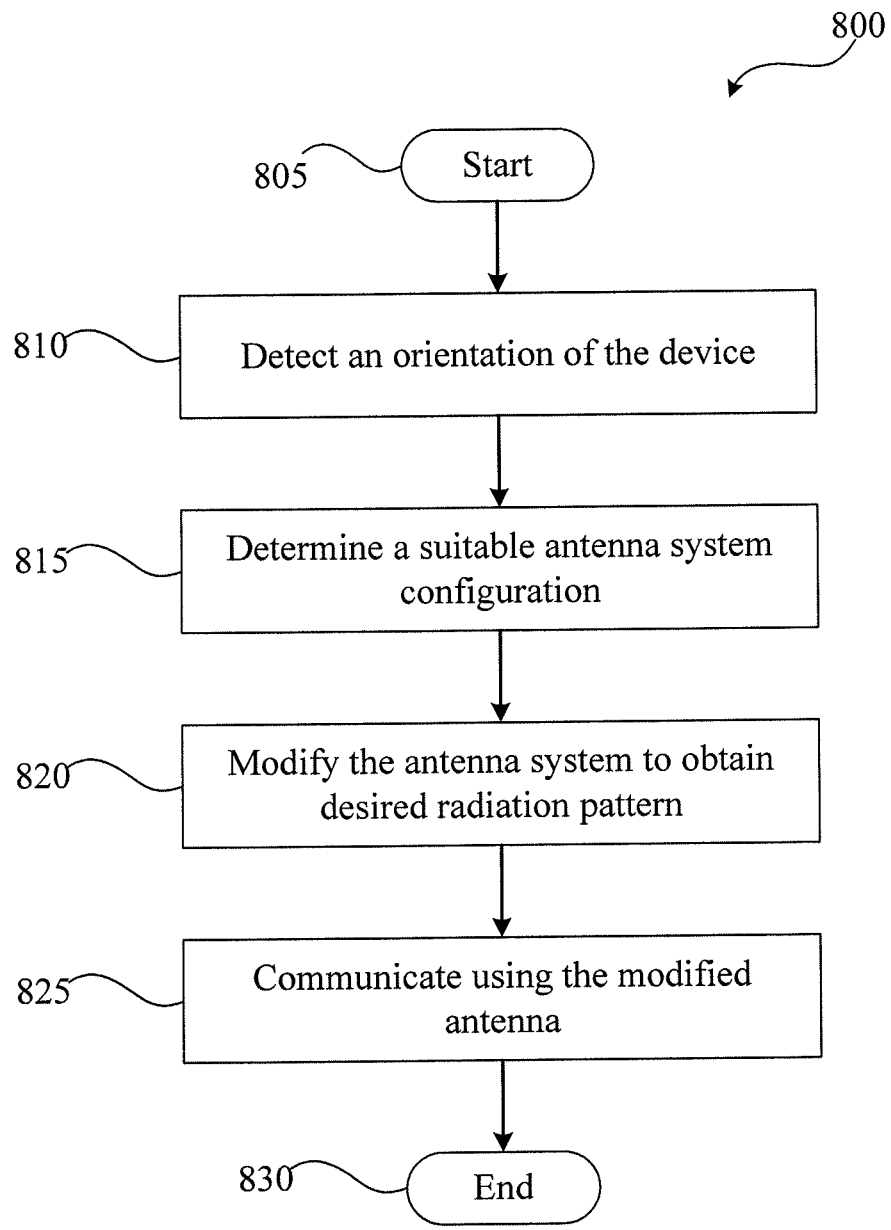
FIG. 8 is flowchart of a method for detecting and utilizing a device orientation in a peer device that can alter an antenna configuration according to some embodiments of the invention.

FIG. 8 is a flow chart of process 800 that can be used to optimize antenna usage in a peer device according to some embodiments of the invention. While process 800 is described in regard to a peer device, this process may also be used with another device (such as a wireless accessory). Process 800 can be used, for example, in execution of computer-implemented software instructions for detecting a usage mode and using that information to alter an antenna configuration. In some embodiments, software instructions can be implemented on a peer device although they can similarly be implemented on another device. The computer-implemented instructions may be executed by a suitably programmed computer, processor, or central processing unit (CPU).

Process 800 can start at block 805. At block 810, the peer device may detect the orientation of the peer device. This detection, for example, may occur in part using an accelerometer, GPS, and/or a proximity sensor.

At block 815, based in whole or in part on the detected orientation, the peer device may determine a suitable configuration for the antenna system within the peer device. In some situations, the peer device determines an antenna pattern from a set of predetermined antenna patterns that provides the highest gain in the direction of the peer device. A predetermined set of antenna patterns can correspond with predetermined antenna configurations that can be implemented. The peer device may determine a suitable configuration for the antenna system by, for example, associating each usage mode with a particular antenna configuration and selecting the antenna configuration based on the user-input usage mode. For example, for a usage mode where the use of a Bluetooth headset is indicated and the peer device is located in the user's pocket, the peer device may select an antenna configuration that provides the maximum gain in an upward direction (i.e., toward the user's head).

Once a suitable antenna configuration is determined, the antenna system of the peer device is modified to operate in that configuration at block 820. As illustrated in FIG. 3, this may consist of enabling, selecting or switching or more monopole antennas arranged in different directions. This may also consist of operating other types of antennas in a variety of different configurations to optimize the radiation pattern. After the antenna system of the peer device is modified to operate in the determined configuration, the peer device may communicate to the peer device using the antenna system at block 825. At block 830 process 800 may end.

Figure 9:
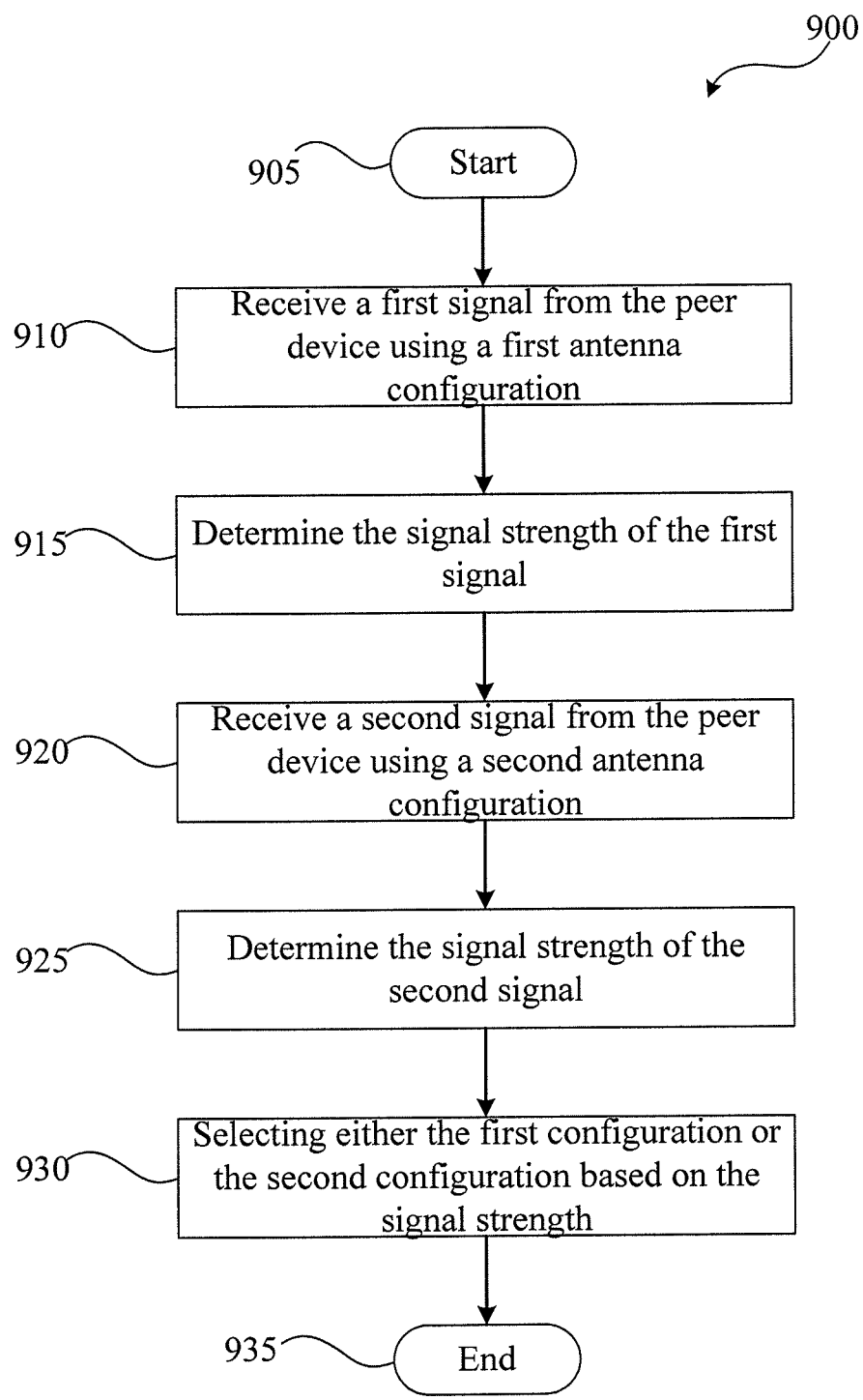
FIG. 9 is flowchart of a method for selecting an antenna configuration based on the signal strengths of different antenna configurations according to some embodiments of the invention.

FIG. 9 is a flow chart of process 900 that can be used to optimize antenna usage in a peer device according to some embodiments of the invention. While process 900 is described in regard to a peer device, this process may also be used with an accessory device. Process 900 can be used, for example, in execution of computer-implemented software instructions for detecting a usage mode and using that information to alter an antenna configuration. In some embodiments, software instructions can be implemented on a peer device although they can similarly be implemented on another device. The computer-implemented instructions may be executed by a suitably programmed computer, processor, or central processing unit (CPU).

Process 900 can start at block 900. At block 905 a first signal may be received from a peer device using a first antenna configuration. This first antenna configuration, for example, can be the antenna configuration shown in FIG. 4A. In this configuration, one of two monopole antennas sends and receives data. In particular, in this configuration antenna 415 is transmitting and receiving data while antenna 420 is not. Various other configurations can be used as described herein. This first antenna configuration may have a first radiation pattern that is optimized for use in a specific direction.

At block 910 the signal strength of the first signal may be determined (or instead may be estimated or measured). In some embodiments, the signal strength may be the signal-to-noise ratio (SNR) of the signal. In some embodiments, the signal strength may be the bit error rate. Note that any suitable type of measure or characteristic may be used to determine or derive the signal strength.

At block 915 a second signal may be received from a peer device using a second antenna configuration. This second antenna configuration, for example, may be the antenna configuration shown in FIG. 4B. In this configuration, one of two monopole antennas can send and receive data. In particular, in this configuration antenna 420 is transmitting and receiving data while antenna 415 is not. Thus, the second antenna configuration is different from the first antenna configuration. Further, the second antenna configuration may have a second radiation pattern that may be optimized for use in a specific direction.

At block 920 the signal strength of the second signal may be determined (or instead may be estimated or measured). The signal strength can determined using the same (or a different) measure as used to measure the signal strength of the first signal.

At block 925 the signal strength of the first signal and the signal strength of the second signal can be compared. The antenna configuration with the best signal strength (i.e., typically the larger signal strength or one preferred for some reason) can be used for communication (block 930). In some embodiments, a change from one antenna configuration to another antenna configuration may occur substantially instantaneously or instead after a set period of time. In some embodiments, a change from one antenna configuration to another antenna configuration may occur only if the difference between the two signal strengths is greater than some threshold value.

Process 900 can execute at random intervals, at predetermined intervals, when a change in orientation of either the peer device and/or the accessory device is detected, when a user input occurs specifying a change in device usage, or in response to another change to the usage mode. In some embodiments, process 900 can execute during standard device communication operations. In some embodiments, process 900 can execute when standard device communication operations are dormant. Process 900 may end at block 935.

Figure 10:
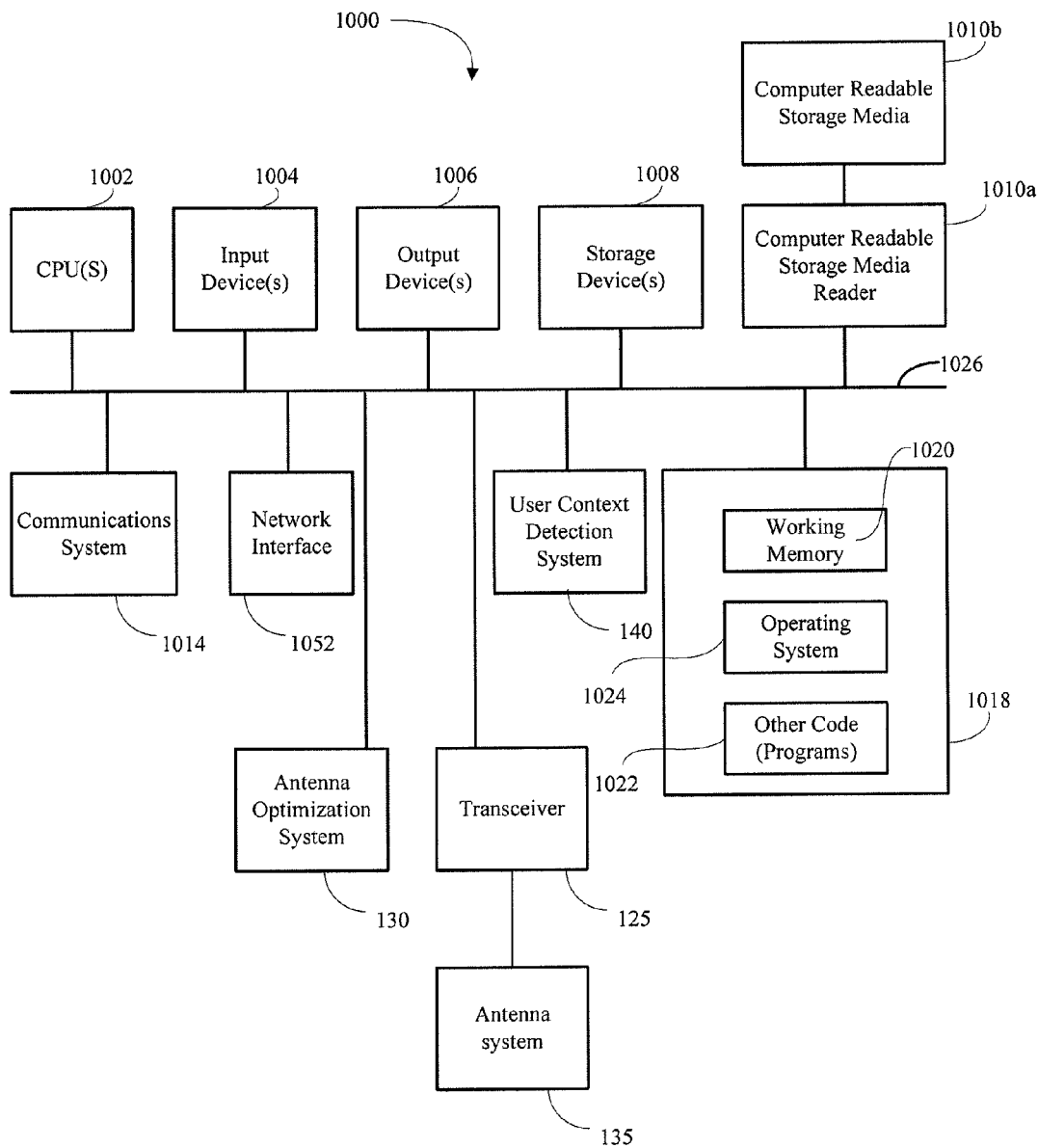
FIG. 10 shows a simplified block diagram of a wireless device that may be used to implement an embodiment of the invention.

FIG. 10 shows a simplified block diagram of a wireless device that may be used to implement an embodiment of the invention. Wireless device 1000 can be used to perform any or all of the steps, operations, or functions shown in FIG. 7, 8 or 9. The drawing illustrates how individual system elements can be implemented in a separated or more integrated manner. Embodiments of the invention may include some or all of the components shown. The wireless device 1000 is shown having hardware elements that are electrically coupled via bus 1026. In some embodiments, individual hardware elements can be coupled directly with one another. In some embodiments, some hardware elements can be implemented in software by execution of a set of instructions by CPU 1002.

Network interface 1052 can communicatively couple wireless device 1000 with another device, for example, through a network such as the Internet or through a wireless network (e.g., a cellular network or WiFi network). The hardware elements can include a processor 1002, an input device 1004, an output device 1006, a storage device 1008, a computer-readable storage media reader 1010a, a communications system 1014, and memory 1018. The computer-readable storage media reader 1010a can be further connected to a computer-readable storage medium 1010b, the combination comprehensively representing remote, local, fixed, and/or removable storage devices plus storage media for temporarily and/or more permanently containing computer-readable information.

Wireless device 1000 may also comprise software elements, shown as being located within working memory 1020, including an operating system 1024 and other code 1022, such as a program designed to implement one or more of the methods and/or processes described herein. In some embodiments, other code 1022 can include software that provides instructions for manipulating the data according to various embodiments disclosed herein. In some embodiments, other code 1022 can include software that can operate wireless device 1000. It will be apparent to those skilled in the art that substantial variations can be used in accordance with specific requirements. For example, customized hardware might also be used and/or particular elements might be implemented in hardware, software (including portable software, such as applets), or both. Further, connection to other computing devices such as network input/output devices can be employed.

As shown in the Figure, user context detection system 140, transceiver 125, and antenna optimization system 130 can be coupled with bus 1026. In some embodiments, antenna optimization system, in particular, can be implemented by instructions executed by CPU 1002. User context detection system 140 can include a user interface. Transceiver 125 can receive signals from CPU 1002 using bus 1026 and transmit them to a peer device through antenna system 135. Transceiver 125 can also receive wireless signals from a peer device through antenna system 135 and provide this signal to the CPU 1002 using bus. Various other configurations can be used.

According to another embodiment of the present invention, a peer device and an accessory device may include antenna optimization systems and the like. For example, the peer device may be a mobile phone with a multi-directional antenna as described with respect to FIG. 8. Meanwhile, the accessory device illustrated in FIG. 8 may be a Bluetooth headset as discussed with respect to FIGS. 4A, 4B, 5A, and 5B. Utilizing such optimization systems on both the peer device and accessory device may advantageously increase the quality of wireless communications while reducing the power requirements of such communications.

The antenna system (e.g., antenna system 300 or 135) can be effective for receiving wireless signals (i.e., electromagnetic radiation in a specific band or frequency range) from a suitable transceiver and transmitting them over the air to another device, and also for receiving wireless signals over the air from a remote device and transmitting them to the transceiver for processing. In addition, the antenna system can have as an input a signal used to define a parameter or variable (for example, a configuration mode in which it should be set) that is used to alter the antenna system in order to optimize the radiation pattern for a particular purpose, use case, configuration, etc.

In some embodiments, the user context detection mechanism operates to determine one or more features of the current usage mode, orientation, location, position, or configuration of the device, as part of optimizing the radiation pattern. A wide range of such features or use modes may be determined, including but not limited to the orientation of the device, whether or not the device is being held, whether or not the device is currently on a call, and what operating mode is in use (for example, whether a mobile phone is in use with a Bluetooth headset or without one). The user context detection mechanism may receive as an input information correlated with usage context, where such information may be a physical signal (such as the direction and strength of an acceleration, or the pressure on a touch surface), or an electrical or software signal (such as a software message from a software system in the peer device that changes according to usage), or another suitable form of information. The context detection mechanism or element may provide as an output a signal correlated with user context and/or usage.

In some embodiments, the antenna optimization system operates to determine a suitable antenna configuration (and hence related output signal) from the user context signal, and provides the output signal to the variable antenna system.

A variety of antenna systems (or types) are possible and may be used in embodiments of the present invention, and for each, a variety of antenna optimization systems may be possible. These antennas can include, but are not limited to, monopole antennas, dipole antennas, Yagi antennas, PCB meander-line antennas, patch antennas and the like. A variety of means of varying the antenna radiation pattern are also possible, including switching between one or more of a plurality of antennas, switching antenna components on or off, changing the phase relationship between different antennas in a multiple-antenna system (or between elements of a single antenna) as in a phased array design, physically rotating or otherwise moving an antenna, physically rotating or moving elements of an antenna (such as a reflector or ground plane) and so forth.

The systems, apparatus, devices, and methods described herein have a wide range of applications; for example, determining which part of a mobile phone, PDA or citizens' band radio is oriented towards the human body and in response reducing radiation intensity in this direction (thereby providing health as well as operational benefits); detecting the orientation of a netbook or laptop computer and optimizing the radiation pattern for connection to a wireless access point, or when at sea or in a remote area (or for GPS systems), ensuring that best GPS signal reception is available (and therefore accuracy) by keeping peak sensitivity oriented to the sky or to a region of the sky.

Embodiments of the invention provide a technical solution to the problem of wireless communication using antennas with non-optimal radiation patterns, and hence the problem of an inefficient use of a battery or other source of power. The technical solutions provided by embodiments of the invention employ the various components and elements discussed above. For example, embodiments of the invention include antenna systems that are capable of being operated so as to have a plurality of different radiation patterns. A usage context detection element or system (e.g., accelerometer, proximity sensor, user interface, etc.) enables a wireless device to select an optimum (or at least more optimal) radiation pattern for the specific use case or context of the wireless device. The wireless device can then be switched between a plurality of possible radiation patterns to provide an optimal (or more optimal) radiation pattern and thereby enable more efficient wireless communication between devices. The embodiments of the invention discussed above describe various other technical solutions to this problem. The embodiments may be implemented using a suitably programmed processing element to process inputs from a sensor, detector, or user interface, and in response to control the configuration of an antenna system or its elements. The antenna system configuration may then be used for the transmission and/or reception of signals in a more efficient manner than may be obtained using a less optimal antenna configuration.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the invention is not limited to the embodiments described above or depicted in the drawings, and various embodiments and modifications can be made without departing from the scope of the claims below.

What is claimed is:

1. A wireless communication device, comprising:
a usage context detection system operable to detect a usage mode of the wireless communication device and to generate an output signal correlated with the usage mode;
wherein the usage context detection system comprises a user interface configured to receive a user input indicating a user-specified usage mode, the user-specified usage mode comprising a general usage mode indicating an operation being performed by the wireless communication device, and a specific usage mode indicating a position of the wireless communication device; wherein the usage context detection system further comprises at least one sensor configured to detect an orientation of the wireless communication device, the output signal being generated based on the general usage mode, the specific usage mode, and the orientation;
an antenna system having a variable radiation pattern; and
an antenna optimization system operable to vary the radiation pattern of the antenna system based on output siganl.

2. The wireless communication device according to claim 1, wherein the usage context detection system comprises a device selected from the group consisting of a GPS, a proximity sensor, and an accelerometer.

3. The wireless communication device according to claim 1, wherein the wireless communication device comprises a mobile telephone.

4. The wireless communication device according to claim 1, wherein the wireless communication device comprises a Bluetooth communication device.

5. The wireless communication device according to claim 1, wherein the antenna system comprises a plurality of antennas.

6. The wireless communication device according to claim 5, wherein the plurality of antennas comprises an antenna array.

7. The wireless communication device according to claim 5, wherein the antenna optimization system modifies a phase difference between a first and a second of the plurality of antennas in order to vary the radiation pattern of the antenna system.

8. The wireless communication device according to claim 5, wherein the antenna optimization system varies the radiation pattern by selecting an antenna from the plurality of antennas 9. The wireless communication device according to claim 8, wherein the antenna optimization system includes a switch coupled to the plurality of antennas, and the radiation pattern of the antenna system is varied by switching between the plurality of antennas.

10. A method comprising:
   determining, at a wireless communication device, a usage mode of the wireless communication device;
   wherein the usage mode comprises a user input, received through a user interface, indicating a user-specified usage mode, the user-specified usage mode comprising a general usage mode indicating an operation being performed by the wireless communication device, and a specific usage mode indicating a position of the wireless communication device, the usage mode further comprising using at least one sensor to detect an orientation of the wireless communication device;
   determining, at the wireless communication device, a suitable antenna configuration based at least in part on an output signal correlated with the usage mode of the wireless communication device, the output signal being generated based on the general usage mode, the specific usage mode, and the orientation; and
   modifying the antenna configuration according to the suitable antenna configuration.

11. The method according to claim 10, wherein the usage mode comprises an orientation of the wireless device.

12. The method according to claim 11, wherein the orientation of the wireless device is determined at least in part using data from an accelerometer.

13. The method according to claim 10, wherein the usage mode comprises a position of the wireless device.

14. The method according to claim 10, wherein the usage mode comprises a proximity of the wireless device relative to a user.

15. The method according to claim 10, wherein the suitable antenna configuration provides a specific radiation pattern.

16. The method according to claim 10, further comprising sending data wirelessly to another wireless communication device using the modified antenna configuration.

17. A wireless communication device comprising:
   a first antenna having a first radiation pattern;
   a second antenna having a second radiation pattern;
   a usage context detection system configured to detect a usage mode of the wireless communication device;
   wherein the usage context detection system comprises a user interface configured to receive a user input indicating a user-specified usage mode, the use-specified usage mode comprising a general usage mode indicating an operation being performed by the wireless communication device; and a specific usage mode indicating a position of the wireless communication device; wherein the usage context detection system further comprises at least one sensor configured to detect an orientation of the wireless communication device; and
   circuitry configured to switch between the first antenna and the second antenna based on an output signal correlated with the usage mode of the wireless communication device, the output signal being generated based on the general usage mode, the specific usage mode, and the orientation.

18. The wireless communication of claim 17, wherein the usage context detection system comprises one or more of an accelerometer, GPS, or a proximity sensor.

19. The wireless communication of claim 17, futher comprising a third antenna, wherein the circuitry is configured to switch between the first antenna, the second antenna, and the third based on the usage mode of the wireless communication device.

* * * * *